United States Patent
Murayama et al.

(10) Patent No.: US 12,014,845 B2
(45) Date of Patent: Jun. 18, 2024

(54) COMPOSITE CABLE

(71) Applicant: Hitachi Metals, Ltd., Tokyo (JP)

(72) Inventors: Tomoyuki Murayama, Tokyo (JP); Yoshikazu Hayakawa, Tokyo (JP); Hirotaka Eshima, Tokyo (JP); Takahiro Futatsumori, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/951,254

(22) Filed: Sep. 23, 2022

(65) Prior Publication Data
US 2023/0094637 A1    Mar. 30, 2023

(30) Foreign Application Priority Data
Sep. 28, 2021    (JP) .................. 2021-158458

(51) Int. Cl.
*H01B 11/02*     (2006.01)
*B60R 16/02*     (2006.01)
*H01B 7/02*      (2006.01)

(52) U.S. Cl.
CPC ....... *H01B 7/0208* (2013.01); *B60R 16/0215* (2013.01); *H01B 11/02* (2013.01)

(58) Field of Classification Search
CPC .... H01B 7/0208; H01B 11/02; B60R 16/0215
USPC ....................................................... 174/115
See application file for complete search history.

(56) References Cited

U.S. PATENT DOCUMENTS

| | | | | |
|---|---|---|---|---|
| 10,163,547 | B2 * | 12/2018 | Hayakawa | H01B 11/02 |
| 2001/0002773 | A1 * | 6/2001 | Hyogo | H01B 9/003 |
| | | | | 307/147 |
| 2014/0096996 | A1 * | 4/2014 | Sidlyarevich | H01B 7/04 |
| | | | | 156/50 |
| 2017/0263353 | A1 * | 9/2017 | Hayakawa | H01B 3/002 |
| 2017/0287590 | A1 * | 10/2017 | Hayakawa | B60R 16/0215 |
| 2018/0061525 | A1 * | 3/2018 | Kohori | H01B 7/295 |
| 2018/0144845 | A1 * | 5/2018 | Hayakawa | B60T 7/107 |
| 2018/0151271 | A1 * | 5/2018 | Sidlyarevich | H02K 11/21 |
| 2018/0281706 | A1 * | 10/2018 | Kobayashi | B60R 16/0215 |
| 2019/0019602 | A1 * | 1/2019 | Hayakawa | H01B 3/002 |
| 2019/0077341 | A1 * | 3/2019 | Kohori | H01B 1/026 |
| 2019/0228874 | A1 * | 7/2019 | Kohori | H01B 11/02 |

FOREIGN PATENT DOCUMENTS

WO     WO 220/111162 A1    6/2020

* cited by examiner

*Primary Examiner* — Timothy J Thompson
*Assistant Examiner* — Michael F McAllister
(74) *Attorney, Agent, or Firm* — MCGINN I.P. LAW GROUP, PLLC.

(57) ABSTRACT

A composite cable is composed of plural electric power wires, a first twisted wire made by laying plural signal wires together, a second twisted wire disposed opposite the first twisted wire with the electric power wires between the first twisted wire and the second twisted wire, and a sheath formed over plural electric power wires, the first twisted wire, and the second twisted wire. The second twisted wire is made by laying plural electric wires including a grounding wire together. Each of the plural electric wires of the second twisted wire is composed of a conductor and an insulator formed over the conductor.

19 Claims, 5 Drawing Sheets

COMPOSITE CABLE

CROSS-REFERENCE TO RELATED APPLICATION

The present patent application claims the priority of Japanese patent application No. 2021-158458 filed on Sep. 28, 2021, and the entire contents thereof are hereby incorporated by reference.

TECHNICAL FIELD

The present invention relates to a composite cable.

BACKGROUND ART

Patent literature 1 discloses a composite cable for being used in electric brakes for automobiles. The composite cable described in Patent literature 1 has been equipped with an electric wire bundle and an outer layer sheath for being formed over the electric wire bundle. The electric wire bundle is constituted by two electric power wires, a first twisted wire (i.e., twisted pair wire strands as described in Patent Literature 1) and a second twisted wire (i.e., two laid wire strands as described in Patent Literature 1). The first twisted wire and the second twisted wire are arranged on mutually opposite sides of the two electric power wires. The first twisted wire is made by laying two signal wires together. The second twisted wire is made by laying together a grounding wire, which is made by forming a coated electric wire composed of a conductor and an insulator formed over the conductor, and a linear filler, which is made by forming a polymer linearly.

CITATION LIST

Patent Literature

Patent Literature 1: WO2020/111162

SUMMARY OF THE INVENTION

In producing the composite cable described in Patent Literature 1, however, there has been difficulty in laying the grounding wire and the linear filler together in a well-balanced manner to form the second twisted wire to constitute part of the electric wire bundle, because the grounding wire is the wire made of a coated electric wire while the linear filler is the wire made of a polymer, and is different in stiffness from the grounding wire. For that reason, when an outer shape of the second twisted wire has become distorted and the resulting composite cable has included the distorted second twisted wire, there has been concern that in the entire composite cable, a permanent bending may occur, which refers to a tendency for bending to occur only in a given direction.

The present invention has been made in light of the foregoing, and the object of the present invention is to provide a composite cable, which is designed to allow for laying second wires (i.e., second wire strands) together in a well-balanced manner.

To achieve the above object, the present invention provides a composite cable, comprising: plural electric power wires; a first twisted wire made by laying plural signal wires together; a second twisted wire disposed opposite the first twisted wire with the electric power wires between the first twisted wire and the second twisted wire, the second twisted wire being made by laying plural electric wires including a grounding wire together; and a sheath formed over the plural electric power wires, the first twisted wire, and the second twisted wire, wherein each of the plural electric wires of the second twisted wire is composed of a conductor and an insulator formed over the conductor.

Effects of the Invention

According to the present invention, it is possible to provide the composite cable designed to allow for laying second wires (i.e., second wire strands) together in a well-balanced manner.

BEST MODE FOR CARRYING OUT THE INVENTION

First Embodiment

A first embodiment of the present invention will be described with reference to FIGS. 1 and 2. Note that embodiments described below are shown as specific examples preferably suitable for implementing the invention, and contain parts that specifically exemplify various technically preferred technical matters, but that the technical scope of the invention is not limited to the specific embodiments.

(Composite Cable 1)

Figure 1:
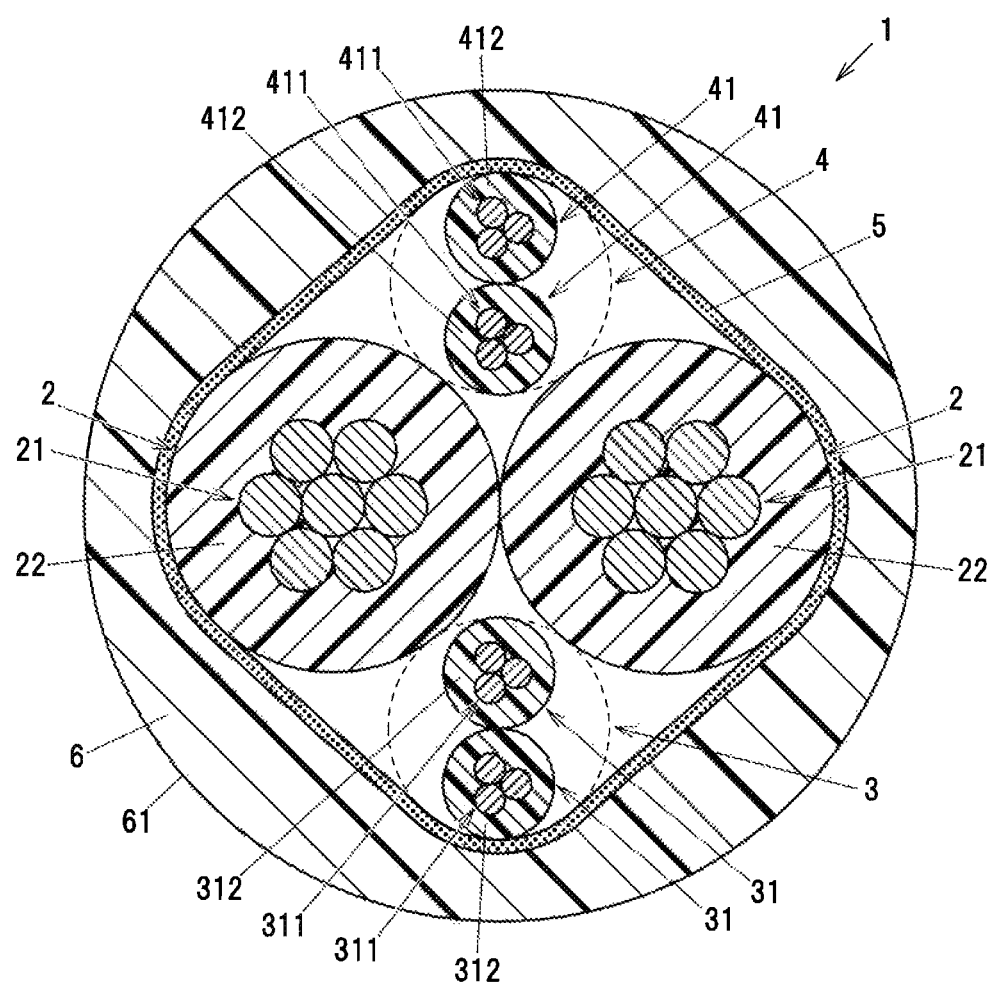
FIG. 1 is a cross-sectional view showing a composite cable in a first embodiment.

FIG. 1 is a cross-sectional view showing a composite cable 1 in the present embodiment. Herein, a longitudinal direction of the composite cable 1 is referred to simply as the longitudinal direction. In addition, the cross-section of the composite cable 1 or the cross-section of part of the composite cable 1, which is referred to herein, refers to the cross-section being at right angles to the longitudinal direction, unless otherwise specified. In addition, the circumferential direction, which is simply referred to herein, refers to the circumferential direction of the composite cable 1, unless otherwise specified.

The composite cable 1 is constituted by two electric power wires 2 and 2, a first twisted wire 3, a second twisted wire 4, a separator 5, and a sheath 6. The first twisted wire 3 is made by laying two signal wires 31 and 31 together. The second twisted wire 4 is made by laying together two electric wires including a grounding wire 41. The two electric power wires 2 and 2, the first twisted wire 3, and the second twisted wire 4 are twisted around each other. The separator 5 is provided around the two electric power wires 2 and 2, the first twisted wire 3, and the second twisted wire 4 being laid together. The sheath 6 is formed on an outer periphery of the separator 5.

The two electric power wires 2 and 2 are electric wires, which are circular in cross-section shape. The two electric power wires 2 and 2 are the coated electric wires each composed of an electric power wire conductor 21 made by laying together plural wires such as copper wires, which are good in electrical conductivity, and an electric power wire insulator 22 formed over the electric power wire conductor 21. The insulators 22 and 22 of the two electric power wires 2 and 2 are made of an electrically insulative resin such as cross-linked polyethylene, for example. In the present embodiment, the two electric power wires 2 and 2 are the same in composition. That is, the two electric power wires 2 and 2 are substantially equal in outer diameter and the conductors 21 and 21 are substantially equal in outer diameter. Note that when plural parts are described as being substantially equal in a dimension or dimensions, the term "substantially equal" referred to here is defined as meaning two cases: (Case 1) The parts match perfectly in a dimension or dimensions. (Case 2) The parts are not but are slightly different in dimension or dimensions as a result of manufacturing errors and the like. For example, if the difference between the largest value and the smallest value of dimensions of plural parts is within 20% of the largest value of the dimensions of the parts, it can be that the dimensions of the parts are substantially equal. In addition, in the present embodiment, the outer diameter of a twisted wire such as the twisted wires of the conductors 21 and 21 of the two electric power wires 2 and 2, can be defined as the diameter of an imaginary circumscribed circle that is circumscribed about a cross-sectional shape of the twisted wire. In addition, the two electric power wires 2 and 2 are made by using the same material for the conductors 21 and 21, and by using the same material for the insulators 22 and 22 as well.

The two electric power wires 2 and 2 are being aligned with each other in such a manner that they are contiguous to each other. The first twisted wire 3 and the second twisted wire 4 are being disposed in such a manner that they fit in two side regions, respectively, enclosed between the two electric power wires 2 and 2 contiguous to each other, and the separator 5. The first twisted wire 3 and the second twisted wire 4 are being disposed on mutually opposite sides of the two electric power wires 2 and 2 contiguous to each other. The reason for disposing the first twisted wire 3 and the second twisted wire 4 in this manner is as follows: The grounding wire 41 of the second twisted wire 4 tends to emit noise around and, as a result, there is concern that the noise emitted from the grounding wire 41 may affect the signal wires 31 of the first twisted wire 3, and thereby cause disruption to signal transmission in the signal wires 31. In view of this concern, the first twisted wire 3 constituted by the two signal wires 31 and 31 laid together is disposed opposite the second twisted wire 4 equipped with the grounding wire 41, with the two electric power wires 2 and 2 contiguous to each other between the first twisted wire 3 and the second twisted wire 4, thereby making it possible to prevent the signal wires 31 of the first twisted wire 3 from being affected by the noise emitted from the grounding wire 41 of the second twisted wire 4. In particular, in the present embodiment, since the two electric power wires 2 and 2 are contiguous to each other (i.e., touching each other), the first twisted wire 3 and the second twisted wire 4 can be disposed without being brought into contact with each other and, moreover, the first twisted wire 3 and the second twisted wire 4 can be further separated from each other. Note that the two electric power wires 2 and 2 may be aligned with each other in such a manner that they are not touching each other, but that it is preferred that in the cross-section of the composite cable 1, the shortest distance between the two electric power wires 2 and 2 be smaller than the shortest distance between the first twisted wire 3 and the second twisted wire 4.

The first twisted wire 3 is being configured in such a manner that it is contiguous to both of the two electric power wires 2 and 2 contiguous to each other. In the present embodiment, the first twisted wire 3 is smaller in outer diameter than the two electric power wires 2 and 2. The signal wires 31 of the first twisted wire 3 are the electric wires, which are circular in cross-section shape. The signal wires 31 are the coated electric wires each composed of a signal wire conductor 311 made by laying together plural wires such as copper wires, which are good in electrical conductivity, and a signal wire insulator 312 formed over the signal wire conductor 311. The insulators 312 of the signal wires 31 are made of an electrically insulative resin such as cross-linked polyethylene, for example. In the present embodiment, the two signal wires 31 and 31 are the same in composition. That is, the two signal wires 31 and 31 are substantially equal in outer diameter and the conductors 311 and 311 are substantially equal in outer diameter. In addition, the two signal wires 31 and 31 are made by using the same material for the conductors 311 and 311, and by using the same material for the insulators 312 and 312 as well.

In the present embodiment, the two electric wires of the second twisted wire 4 are the grounding wires 41 and 41 that are connected to the ground. Note that as long as the two electric wires of the second twisted wire 4 include at least one grounding wire 41, they may include an electric wire other than the grounding wire 41. As one example, the two electric wires of the second twisted wire 4 may be configured as the grounding wire 41 and a coated electric wire that is not to be energized. As another example, the plural electric wires of the second twisted wire 4 can be configured as the grounding wire 41 and a wire break detecting wire. In the present embodiment, the number of electric wires of the second twisted wire 4 is the same as the number of electric wires of the first twisted wire 3.

The second twisted wire 4 is being configured in such a manner that it is contiguous to both of the two electric power wires 2 and 2 contiguous to each other. In the present embodiment, the second twisted wire 4 is smaller in outer diameter than the two electric power wires 2 and 2. The grounding wires 41 and 41 of the second twisted wire 4 are the electric wires, which are circular in cross-section shape. The grounding wires 41 and 41 are the coated electric wires each composed of a conductor 411 made by laying together wires such as copper wires, which are good in electrical conductivity, and an insulator 412 formed over the conductor 411. The insulators 412 and 412 of the grounding wires 41 and 41 are made of an electrically insulative resin such as cross-linked polyethylene, for example. In this manner, the coated electric wires are configured for all of the electric wires of the second twisted wire 4 including the grounding wire 41, thereby making it possible to lay the second electric wires (i.e., the second electric wire strands) 4 together in a well-balanced manner, to form the second twisted wire 4.

Unlike the second twisted wire 4 in the present embodiment, the twisted wire disclosed in WO2020/111162 (i.e., the aforementioned Patent Literature 1), for example, is formed by laying together the grounding wire using an insulating coating, and the linear filler made of a polymer. When plural wire rods, which differ in composition, are laid together in this manner, they twist, for example as if the wire rod having relatively low stiffness is wound around the wire rod having relatively high stiffness. This leads to difficulty in laying the wire strands together in a well-balanced manner, and the resulting twisted wire becomes distorted.

In view of this, in the present embodiment, the coated electric wires each composed of the conductor 411 and the insulator 412 formed over the conductor 411 are being configured for all of the plural electric wires, including the grounding wire 41, which are laid together to form the second twisted wire 4. Therefore, for plural electric wires to be laid together to constitute the second twisted wire 4, their stiffnesses can be brought close to each other, thereby making it possible to lay the second electric wires (i.e., second electric wire strands) 4 together in a well-balanced manner.

In the present embodiment, the two grounding wires 41 and 41 to be laid together to constitute the second twisted wire 4 are the same in composition. That is, the two grounding wires 41 and 41 are substantially equal in outer diameter and the conductors 411 and 411 are substantially equal in outer diameter. In addition, the two grounding wires 41 and 41 are made by using the same material for the conductors 411 and 411, and by using the same material for the insulators 412 and 412 as well. Therefore, the second electric wires (i.e., the second electric wire strands) 4 can be laid together in an even better-balanced manner.

The two grounding wires 41 and 41 to be laid together to constitute the second twisted wire 4 can be made of electric wires which are the same in composition as the two signal wires 31 and 31 to be laid together to constitute the first twisted wire 3. That is, the signal wires 31 and 31 and the grounding wires 41 and 41 are substantially equal in outer diameter, and the signal wire conductors 311 and 311 and the conductors 411 and 411 are substantially equal in outer diameter. In addition, the signal wires 31 and 31 and the grounding wires 41 and 41 are made by using the same material for the signal wire conductors 311 and 311 and the conductors 411 and 411, and by using the same material for the signal wire insulators 312 and 312 and the insulators 412 and 412 as well. Note that the way to configure the two signal wires 31 and 31 of the first twisted wire 3 and the two grounding wires 41 and 41 of the second twisted wire 4 is not limited to the foregoing, but that the two signal wires 31 and 31 and the two grounding wires 41 and 41 may be configured in such a manner that they are made of coated electric wires which differ in composition. In the present embodiment, the outer shapes of the first twisted wire 3 and the second twisted wire 4 are smaller than the outer shapes of the two electric power wires 2 and 2.

A lay direction of the first twisted wire 3 and a lay direction of the second twisted wire 4 are the same. In addition, the overall lay direction of the two electric power wires 2 and 2, the first twisted wire 3, and the second twisted wire 4 is opposite to the lay directions of the first twisted wire 3 and the second twisted wire 4. In addition, the two electric power wires 2 and 2, the first twisted wire 3, and the second twisted wire 4 being laid together are being enclosed by the separator 5.

The separator 5 is made of, for example, a paper, a non-woven fabric cloth, a resin tape, or the like, and is being wrapped helically around an outer periphery of the two electric power wires 2 and 2, the first twisted wire 3, and the second twisted wire 4 being laid together. The separator 5 is separating the two electric power wires 2 and 2, the first twisted wire 3, and the second twisted wire 4 from the sheath 6, thereby preventing the sheath 6 from adhering tightly to the two electric power wires 2 and 2, the first twisted wire 3, and the second twisted wire 4 and causing difficulty in termination working for the composite cable 1. In addition, the separator 5 serves to prevent the two electric power wires 2 and 2, the first twisted wire 3, and the second twisted wire 4 from being unlaid. The outer periphery of the separator 5 is being coated with the sheath 6.

The sheath 6 is made of an electrically insulative resin or the like. In the present embodiment, the sheath 6 is being formed in a single layer and is made of a thermoplastic urethane, which is excellent in flexibility and durability. The sheath 6 can be formed on the outer periphery of the separator 5 by extrusion molding. The sheath 6 is being formed in such a manner that its outer peripheral surface 61 is substantially circular in cross-section shape.

Example of Use of the Composite Cable 1

Figure 2:
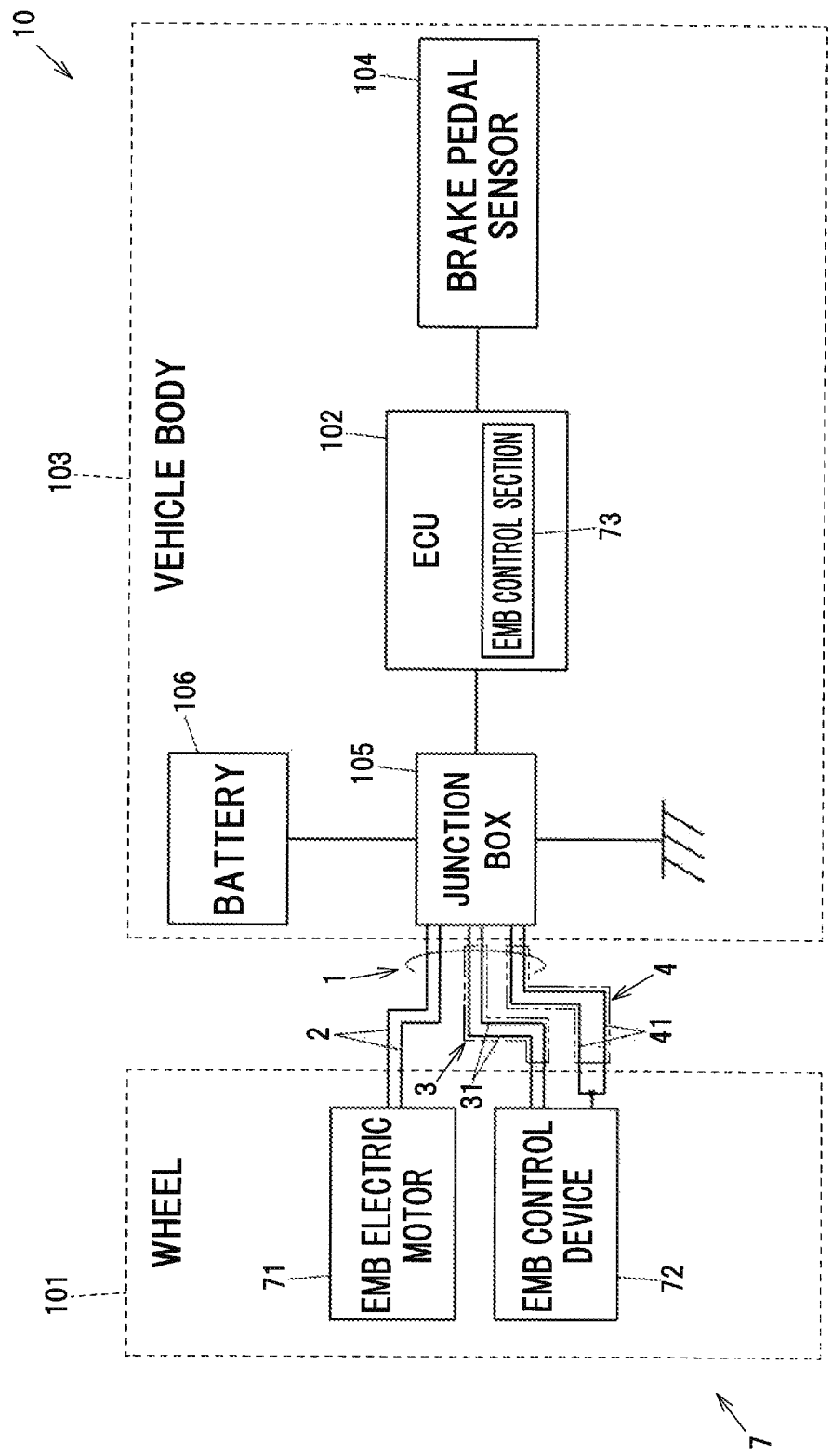
FIG. 2 is an explanatory schematic diagram showing an electromechanical brake using the composite cable in the first embodiment.

An example of the use of composite cable 1 is shown in FIG. 2. In this example, the composite cable 1 in the present embodiment is applied to an electro-mechanical brake (EMB) 7 in a vehicle 10. The electro-mechanical brake 7 (herein also referred to as EMB 7) is equipped with an EMB electric motor 71, an EMB control device 72, and an EMB control section 73.

The EMB electric motor 71 and the EMB control device 72 are being mounted in a wheel 101 of the vehicle 10. In addition, the EMB control section 73 is being mounted in an electronic control unit (ECU) 102 of the vehicle 10. The electronic control unit 102 (herein also referred to as ECU 102) is being mounted in a vehicle body 103 of the vehicle 10, and is being designed to operate controls of each type in the vehicle 10. Note that the EMB control section 73 may be mounted in a control unit other than the ECU 102, or may be mounted in a dedicated hardware unit.

The EMB electric motor 71 is being provided with a piston fitted with a brake pad, though not shown. In addition, the EMB electric motor 71 is being configured to be rotationally driven to move the above-mentioned piston so that the brake pad fitted to the piston is pressed against the disc rotor of the wheel 101, thereby enabling a braking force to act thereon.

The EMB control device 72 is being configured to control the EMB electric motor 71 in response to a control signal from the EMB control section 73 of the ECU 102. In addition, the EMB control device 72 is being configured to enable detection of a malfunction, etc. in the EMB electric motor 71. The EMB control device 72 and the EMB control section 73 are being connected together via a CAN (i.e., Controller Area Network) and are being configured to enable communication with each other.

The EMB control section 73 is being configured to operate the EMB control device 72 to control the force to drive the EMB electric motor 71 rotationally, in response to an output signal from a brake pedal sensor 104, which is being designed to detect an amount to operate the brake pedal of the vehicle 10, such as an amount of force to depress the brake pedal or an amount to displace the brake pedal. This enables the braking force desired by a driver to act on the wheel 101.

The composite cable 1 is being connected to the EMB electric motor 71 and the EMB control device 72 at its wheel 101 side end, while being connected to a junction box 105 at its opposite end to the wheel 101-side, which is being provided in the vehicle body 103. The two electric power wires 2 and 2 of the composite cable 1 are being connected to the EMB electric motor 71 at their wheel 101 side ends. The two electric power wires 2 and 2 are used to provide driving electric current to the EMB electric motor 71. In addition, the two signal wires 31 and 31 of the composite cable 1 are being connected to the EMB control device 72 at their wheel 101 side ends. The two signal wires 31 and 31 are used as CAN cables. In addition, the two grounding wires 41 and 41 of the composite cable 1 are being connected in parallel to signal ground in the EMB control device 72 at their wheel 101 side ends. Note that the two grounding wires 41 and 41 may be connected to, for example, a housing or the like for the EMB electric motor 71 or the EMB control device 72.

The composite cable 1 is being connected to the junction box 105 provided in the vehicle body 103 at its opposite end to the wheel 101 side. The two electric power wires 2 and 2 of the composite cable 1 are being connected to a battery 106, which is being mounted in the vehicle 10, with the junction box 105 between the battery 106 and the electric power wires 2 and 2, and the two signal wires 31 and 31 of the composite cable 1 are being connected to the battery 106 with the junction box 105 between the battery 106 and the signal wires 31 and 31, while the two grounding wires 41 and 41 of the composite cable 1 are being grounded to the vehicle body 103, etc. with the junction box 105 between that vehicle body 103 and the grounding wires 41 and 41.

Although in FIG. 2, for simplicity, only one wheel 101 is shown, the EMB Electric motor 71 and the EMB control device 72 may be mounted in each wheel of the vehicle 10, or they may be mounted in only the front wheels or only the rear wheels of the vehicle 10. In addition, although in the present embodiment the composite cable 1 is being used for the EMB 7, the use of the composite cable 1 is not limited to this. For example, the composite cable 1 can be used for an electric parking brake (EPB). In this case, it is possible to employ such a configuration that the two electric power wires 2 and 2 of the composite cable 1 are connected to an electric motor for the EPB, and the two signal wires 31 and 31 of the composite cable 1 are connected to an ABS sensor, while the two grounding wires 41 and 41 of the composite cable 1 are connected to a housing or the like for the electric motor for the EPB. The composite cable 1 can also be used in applications other than the application to the vehicle.

Actions and Advantageous Effects of the First Embodiment

In the present embodiment, all of the plural electric wires of the second twisted wire 4 including the grounding wires 41 are the coated electric wires each composed of the conductor 411 and the insulator 412 formed over the conductor 411. Therefore, for plural electric wires to be laid together to constitute the second twisted wire 4, their stiffnesses can be brought close to each other, thereby making it possible to lay the second electric wires (i.e., second electric wire strands) 4 together in a well-balanced manner. This makes it possible to prevent the outer shape of the second twisted wire 4 from becoming distorted.

If the second twisted wire 4 is not being laid in a well-balanced manner and is distorted, there is concern that in the entire composite cable 1, a permanent bending may occur, which refers to a tendency for a bending to occur only in a given direction. For example, in the present embodiment, if the second twisted wire 4 is distorted, it is conceivable that the cross-sectional shape of the separator 5 enclosing the electric wire bundle including the distorted second twisted wire 4 is liable to deviate from a circular shape and become distorted, causing the thickness of the sheath 6 formed over the separator 5 to vary greatly depending on position in the circumferential direction. If this happens, the sheath 6 is easily bent, especially in its region of small thickness, causing a permanent bending of the composite cable 1. If the permanent bending of the composite cable 1 occurs, there is concern that stress resulting from that bending may repeatedly act on the same part of the composite cable 1, and hasten the occurrence of a wire break in the electric wires of the composite cable 1. On the other hand, in the present embodiment, the second electric wires (i.e., the second electric wire strands) 4 can be laid together in a well-balanced manner to form the second twisted wire 4 as described previously, thereby making it possible to suppress the permanent bending of the composite cable 1 and therefore ensure longer life of the composite cable 1.

In addition, the plural electric wires of the second twisted wire 4 are substantially equal in outer diameter. Therefore, it is possible to lay the second electric wires (i.e., the second electric wire strands) 4 together in an even better-balanced manner.

In addition to being substantially equal in outer diameter, the plural electric wires of the second twisted wire 4 are substantially equal in the outer diameters of the conductors 411. That is, for the plural electric wires of the second twisted wire 4, the shapes of the conductors 411 are close to each other, while the shapes of the insulators 412 are close to each other. This enables the stiffnesses of the plural electric wires of the second twisted wire 4 to be brought close to each other, thereby making it possible to lay the second electric wires (i.e., second electric wire strands) 4 together in an even better-balanced manner.

In addition, plural signal wires 31 of the first twisted wire 3 and the plural electric wires 41 of the second twisted wire 4 are substantially equal in outer diameter. Furthermore, the signal wire conductors 311 of the signal wires 31 and the conductors 411 of the electric wires 41 are substantially equal in outer diameter. Therefore, the shape and stiffness of the first twisted wire 3 and the shape and stiffness of the second twisted wire 4 can be brought close to each other, thereby making it possible to lay the two electric power wires 2 and 2, the first twisted wire 3 and the second twisted wire 4 together in a well-balanced manner This enables the cross-sectional shape of the separator 5 to be brought close to a circular shape and, as a result, the thickness of the sheath 6 can be homogenized in the circumferential direction, thereby making it possible to further suppress the permanent bending of the composite cable 1.

In addition, for plural electric wires 41 and 41 together constituting the second twisted wire 4, the conductors 411 and 411 are made of the same material, while the insulators 412 and 412 are also made of the same material. This also enables the stiffnesses of plural electric wires 41 and 41 together constituting the second twisted wire 4 to be brought close to each other, thereby making it possible to lay the second electric wires (i.e., the second electric wire strands) 4 together in an even better-balanced manner.

In addition, for plural signal wires 31 together constituting the first twisted wire 3 and plural electric wires 41 together constituting the second twisted wire 4, the signal wire conductors 311 of the signal wires 31 and the conductors 411 of the electric wires 41 are made of the same material, while the signal wire insulators 312 and the insulators 412 are also made of the same material. This enables the stiffness of the first twisted wire 3 and the stiffness of the second twisted wire 4 to be brought close to each other, thereby making it possible to lay the two electric power wires 2 and 2, the first twisted wire 3 and the second twisted wire 4 together in a well-balanced manner. This enables the cross-sectional shape of the separator 5 to be brought close to a circular shape and, as a result, the thickness of the sheath 6 can be homogenized in the circumferential direction, thereby making it possible to further suppress the permanent bending of the composite cable 1.

In addition, the second twisted wire 4 includes plural grounding wires 41. By composing the second twisted wire 4 of the electric wires of the same type, there is no need to distinguish between the electric wires of the same type by, for example, color coding. In addition, when the plural grounding wires 41 are connected to the same destination (in the present embodiment, the EMB control device 72), the destination can be distributed with plural grounding wires 41 and connected to the ground, thereby making it possible to reduce the impedance in the connection to ground.

In addition, the sheath 6 is being formed on the outer periphery of the separator 5 and is also being formed in a single layer. Therefore, while the manufacturing process of the composite cable 1 can be facilitated or the reduction of the weight of the composite cable 1 can be ensured, the occurrence of permanent bending of the composite cable 1 becomes more pronounced. That is, for example, when another outer sheath is formed on the outer side of the sheath 6, the permanent bending of the inner sheath 6 can be mitigated by the presence of the outer sheath, but when the sheath 6 on the outer periphery of the separator 5 is being formed in a single layer as in the present embodiment, the permanent bending of the composite cable 1 is liable to occur. For this composite cable 1, the benefit of being able to suppress the occurrence of permanent bending in the composite cable 1, which is one of the advantageous effects of the present embodiment, is significant.

As described above, according to the present embodiment, it is possible to provide the composite cable 1 that makes it possible to lay the second electric wires (i.e., the second electric wire strands) together in a well-balanced manner to form the second twisted wire 4.

Second Embodiment

Figure 3:
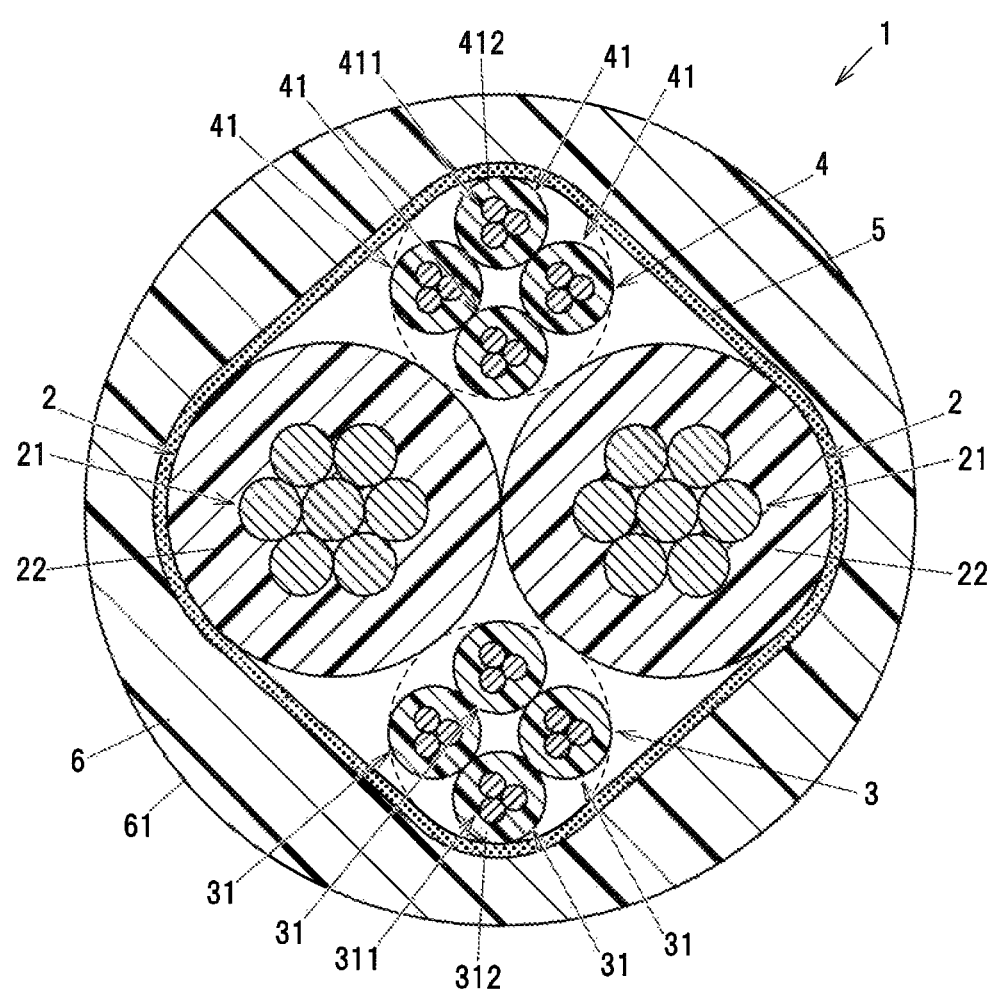
FIG. 3 is a cross-sectional view showing a composite cable in a second embodiment.

FIG. 3 shows a cross-sectional view showing a composite cable 1 in a second embodiment. Compared to the first embodiment, the composite cable 1 in the second embodiment is configured in such a way that the first twisted wire 3 is constituted by four signal wires 31 while the second twisted wire 4 is constituted by four electric wires.

The first twisted wire 3 is constituted by four signal wires 31 of the same composition being laid together. The second twisted wire 4 is constituted by four coated electric wires of the same composition being laid together. In addition, the four coated electric wires of the second twisted wire 4 may include at least one grounding wire 41. For example, the second twisted wire 4 may be constituted by two grounding wires 41, and two coated electric wires not to be energized, or the second twisted wire 4 may be constituted by four grounding wires 41. In FIG. 3, an example is shown in which all of the four coated electric wires together constituting the second twisted wire 4 are the grounding wires 41. The four coated electric wires of the second twisted wire 4 may not be the same in composition.

The other configurations of the second embodiment are similar to those of the first embodiment.

Note that the same reference characters used in the second and subsequent embodiments as those used in the previous embodiment represent the same elements, etc., as those in the previous embodiment, unless otherwise indicated.

Actions and Advantageous Effects of the Second Embodiment

The second embodiment also has similar actions and advantageous effects to those of the first embodiment.

Third Embodiment

Figure 4:
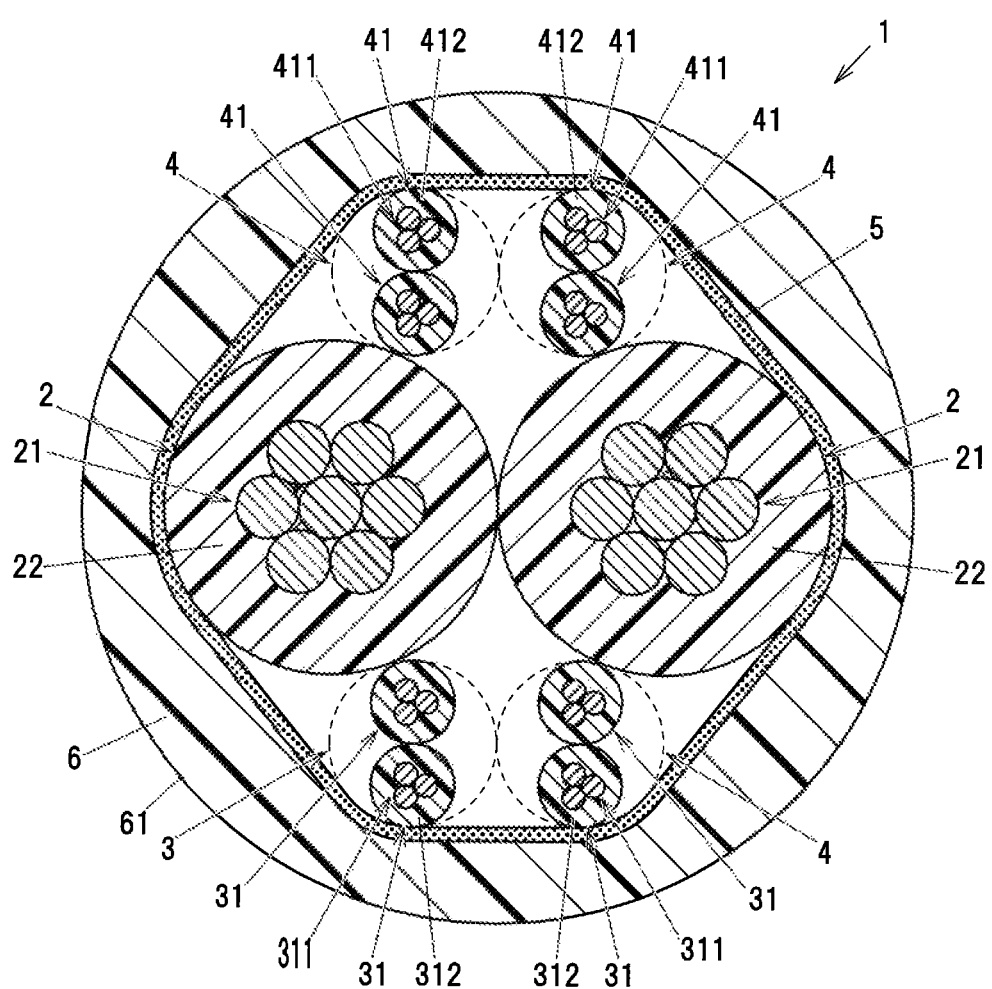
FIG. 4 is a cross-sectional view showing a composite cable in a third embodiment.

FIG. 4 shows a cross-sectional view showing a composite cable 1 in a third embodiment. Compared to the first embodiment, the composite cable 1 in the third embodiment is configured in such a way that two first twisted wires 3 and two second twisted wires 4 are provided.

The composition of each of the two first twisted wires 3 is the same as the composition of the first twisted wire 3 in the first embodiment. The two first twisted wires 3 are being disposed on the same side of the two electric power wires 2 and 2. In addition, the composition of each of the two second twisted wires 4 is the same as the composition of the second twisted wire 4 in the first embodiment. The two second twisted wires 4 are being disposed on the opposite side of the two electric power wires 2 and 2 to the side on which the two first twisted wires 3 are being disposed. The two first twisted wires 3 and the two second twisted wires 4 are thereby being separated from each other with the two electric power wires 2 and 2 therebetween. Note that although in FIG. 4, an example is shown in which all of the four coated electric wires of the two second twisted wires 4 are the grounding wires 41, the way to configure the four coated electric wires of the two second twisted wires 4 is not limited to this example, but that at least one of the four coated electric wires of the two second twisted wires 4 may be the grounding wire 41. The other configurations of the third embodiment are similar to those of the first embodiment.

Functions and Advantageous Effects of the Third Embodiment

The third embodiment also has similar actions and advantageous effects to those of the first embodiment.

Fourth Embodiment

Figure 5:
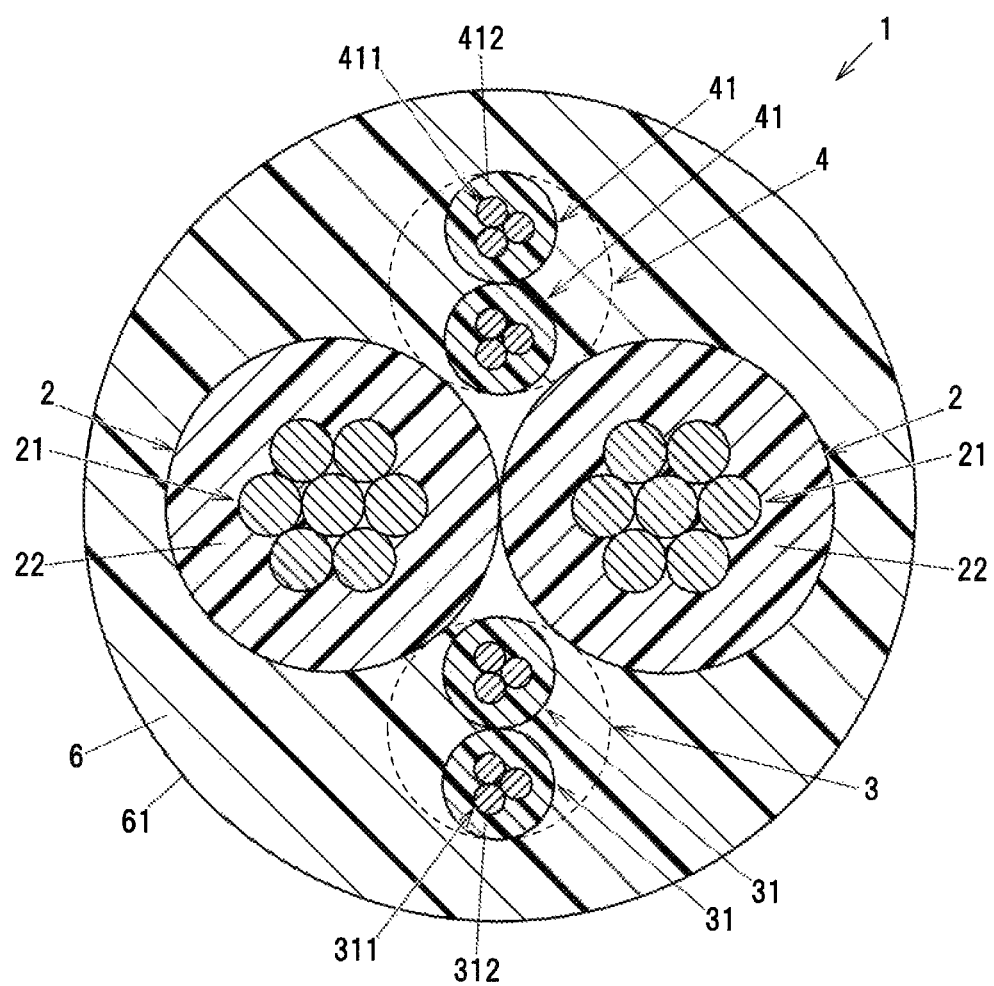
FIG. 5 is a cross-sectional view showing a composite cable in a fourth embodiment.

FIG. 5 shows a cross-sectional view showing a composite cable 1 in a fourth embodiment. Compared to the first embodiment, the composite cable 1 in the fourth embodiment is configured in such a way that the composition of the sheath 6 is altered.

In the fourth embodiment, the sheath 6 is being formed directly over the two electric power wires 2 and 2, the first twisted wires 3, and the second twisted wires 4.

The sheath 6 can be formed by extrusion molding on an outer periphery of the two electric power wires 2 and 2, the first twisted wire 3, and the second twisted wire 4 being laid together, for example.

The other configurations of the fourth embodiment are similar to those of the first embodiment.

Actions and Advantageous Effects of the Fourth Embodiment

Even in the configuration as in the fourth embodiment in which the two electric power wires 2 and 2, the first twisted wire 3, and the second twisted wire 4 are being coated directly with the sheath 6, if the second twisted wire 4 is not being laid in a well-balanced manner but being formed distortedly, there is concern that the permanent bending of the composite cable 1 may occur. That is, if the second twisted wire 4 is not being laid in a well-balanced manner but is being formed distortedly, the two electric power wires 2 and 2, the first twisted wire 3, and the second twisted wire 4 are difficult to lay together in a well-balanced manner, and the resulting entire shape of the two electric power wires 2 and 2, the first twisted wire 3, and the second twisted wire 4 can also be distorted. In this case, the thickness of the sheath 6 being formed directly over the two electric power wires 2 and 2, the first twisted wire 3, and the second twisted wire 4 varies in the circumferential direction, causing the sheath 6 to easily bent in its region of small thickness, leading to a permanent bending of the composite cable 1. In view of this, in the fourth embodiment, in the same way as in the first embodiment, each of the plural electric wires of the second twisted wire 4 including the grounding wires 41, is composed of the conductor 411 and the insulator 412 formed over the conductor 411, thereby making it possible to lay the second electric wires (i.e., second electric wire strands) 4 together in a well-balanced manner, and therefore suppress the occurrence of permanent bending of the composite cable 1. Besides, the fourth embodiment also has similar actions and advantageous effects to those of the first embodiment.

SUMMARY OF THE EMBODIMENTS

Next, the technical ideas grasped from the above-described embodiments will be described with the aid of the reference characters and the like in the embodiments. It should be noted, however, that each of the reference characters and the like in the following descriptions is not to be construed as limiting the elements in the appended claims to the members and the like specifically shown in the embodiments.

According to the feature [1], a composite cable 1 is composed of plural electric power wires 2; a first twisted wire 3 made by laying plural signal wires 31 together; a second twisted wire 4 disposed opposite the first twisted wire 3 with the electric power wires 2 between the first twisted wire 3 and the second twisted wire 4, the second twisted wire 4 being made by laying plural electric wires including a grounding wire 41 together; and a sheath 6 formed over plural electric power wires 2, the first twisted wire 3, and the second twisted wire 4, wherein each of the plural electric wires of the second twisted wire 4 is composed of a conductor 411 and an insulator 412 formed over the conductor 411.

According to the feature [2], in the composite cable 1 as described in the feature [1], the plural electric wires of the second twisted wire 4 are substantially equal in outer diameter.

According to the feature [3], in the composite cable 1 as described in the feature [2], the plural electric wires of the second twisted wire 4 are substantially equal in outer diameters of the conductors 411.

According to the feature [4], in the composite cable 1 as described in the feature [3], each of the plural signal wires 31 of the first twisted wire 3 is composed of a signal wire conductor 311 and a signal wire insulator 312 formed over the signal wire conductor 311, wherein the plural signal wires 31 of the first twisted wire 3 and the plural electric wires of the second twisted wire 4 are substantially equal in outer diameter, wherein the signal wire conductors 311 of the plural signal wires 31 of the first twisted wire 3 and the conductors 411 of the plural electric wires of the second twisted wire 4 are substantially equal in outer diameter.

According to the feature [5], in the composite cable 1 as described in any one of the features [1] to [4], the plural electric wires of the second twisted wire 4 are made by using a same material for the conductors 411, and by using a same material for the insulators 412.

According to the feature [6], in the composite cable 1 as described in the feature [5], each of the plural signal wires 31 of the first twisted wire 3 is composed of a signal wire conductor 311 and a signal wire insulator 312 formed over the signal wire conductor 311, wherein the plural signal wires 31 of the first twisted wire 3 and the plural electric wires of the second twisted wire 4 are made by using a same material for the signal wire conductors 311 and the conductors 411, and by using a same material for the signal wire insulators 312 and the insulators 412.

According to the feature [7], in the composite cable 1 as described in any one of the features [1] to [6], the second twisted wire 4 includes plural grounding wires 41.

According to the feature [8], the composite cable 1 as described in any one of the features [1] to [7] further comprises a separator 5 provided around the plural electric power wires 2, the first twisted wire 3, and the second twisted wire 4, wherein the sheath 6 is being formed over an outer periphery of the separator 5 and is being formed in a single layer.

APPENDIX

Although the embodiments of the present invention have been described above, the above-described embodiments are not to be construed as limiting the inventions according to the appended claims. In addition, it should be noted that not all the combinations of the features described in the embodiments are indispensable to the means for solving the problem of the invention. In addition, the present invention can appropriately be modified and implemented without departing from the spirit thereof.

The invention claimed is:

1. A composite cable, comprising:
   plural electric power wires;
   a first twisted wire made by laying plural signal wires together;
   a second twisted wire disposed opposite the first twisted wire with the electric power wires between the first twisted wire and the second twisted wire, the second twisted wire being made by laying plural grounding wires having a cross-sectional area smaller than that of the plural electric power wires; and
   a sheath formed over plural electric power wires, the first twisted wire, and the second twisted wire,
   wherein each of the plural grounding wires of the second twisted wire is composed of a conductor and an insulator formed over the conductor.

2. The composite cable according to claim 1, wherein the plural grounding wires of the second twisted wire are substantially equal in outer diameter.

3. The composite cable according to claim 2, wherein the plural grounding wires of the second twisted wire are substantially equal in outer diameters of the conductors.

4. The composite cable according to claim 3, wherein each of the plural signal wires of the first twisted wire is composed of a signal wire conductor and a signal wire insulator formed over the signal wire conductor, wherein the plural signal wires of the first twisted wire and the plural grounding wires of the second twisted wire are substantially equal in outer diameter, wherein the signal wire conductors of the plural signal wires of the first twisted wire and the conductors of the plural grounding wires of the second twisted wire are substantially equal in outer diameter.

5. The composite cable according to claim 1, wherein the plural grounding wires of the second twisted wire are made by using a same material for the conductors, and by using a same material for the insulators.

6. The composite cable according to claim 5, wherein each of the plural signal wires of the first twisted wire is composed of a signal wire conductor and a signal wire insulator formed over the signal wire conductor, wherein the plural signal wires of the first twisted wire and the plural grounding wires of the second twisted wire are made by using a same material for the signal wire conductors and the conductors, and by using a same material for the signal wire insulators and the insulators.

7. The composite cable according to claim 1, further comprising:
 a separator provided around the plural electric power wires, the first twisted wire, and the second twisted wire, wherein the sheath is formed over an outer periphery of the separator and is formed in a single layer.

8. The composite cable according to claim 1, wherein each of the plural grounding wires is connected to ground.

9. The composite cable according to claim 1, wherein each of the plural electric power wires comprises an electric power wire conductor and an electric power wire insulator formed over the electric power wire conductor, and
 wherein the electric power wire conductor of each of the plural electric power wires is formed in a single layer.

10. The composite cable according to claim 1, wherein the composite cable comprises two of the first twisted wire and two of the second twisted wire.

11. The composite cable according to claim 1, wherein the sheath is formed by extrusion molding on an outer periphery of the plural electric power wires, the first twisted wire, and the second twisted wire.

12. The composite cable according to claim 1, wherein the plural electric power wires have a circular cross-section.

13. The composite cable according to claim 1, wherein the plural electric power wires are aligned with each other so as to be contiguous to each other.

14. The composite cable according to claim 1, further comprising a separator, the sheath being formed on an outer periphery of the separator.

15. The composite cable according to claim 14, wherein the plural electric power wires are contiguous to each other, and
 wherein the first twisted wire and the second twisted wire are disposed so as to fit in two side regions, respectively, enclosed between the plural electric power wires contiguous to each other, and the separator.

16. The composite cable according to claim 1, wherein the first twisted wire and the second twisted wire are disposed on mutually opposite sides of the plural electric power wires, the plural electric power wires being contiguous to each other.

17. The composite cable according to claim 1, wherein the first twisted wire and the second twisted wire are disposed so as to be devoid of contacting each other.

18. The composite cable according to claim 1, wherein in a cross-section of the composite cable, a shortest distance between the plural electric power wires is smaller than a shortest distance between the first twisted wire and the second twisted wire.

19. The composite cable according to claim 1, wherein a number of grounding wires of the second twisted wire is the same as a number of signal wires of the first twisted wire.

* * * * *